United States Patent [19]
Lee

[11] Patent Number: 5,953,397
[45] Date of Patent: Sep. 14, 1999

[54] COMPUTER SYSTEM WITH MODE SWITCHING FUNCTION AND METHOD OF CONTROLLING THE SAME

[75] Inventor: Surg-June Lee, Suwon, Rep. of Korea

[73] Assignee: SamSung Electronics Co., Ltd., Suwon, Rep. of Korea

[21] Appl. No.: 08/854,350

[22] Filed: May 12, 1997

[30] Foreign Application Priority Data

May 10, 1996 [KR] Rep. of Korea ...................... 96-15377
Apr. 10, 1997 [KR] Rep. of Korea ...................... 97-13327

[51] Int. Cl.[6] ................................................. H04M 11/00
[52] U.S. Cl. .................................... 379/100.16; 379/93.11
[58] Field of Search ............................. 379/93.05–93.09, 379/93.11, 93.14, 93.26, 93.37, 100.15, 100.16, 67.1, 102.01, 102.02

[56] References Cited

U.S. PATENT DOCUMENTS

| | | |
|---|---|---|
| 4,916,607 | 4/1990 | Teraichi et al. ...................... 379/93.11 |
| 5,001,745 | 3/1991 | Pollock . |
| 5,056,132 | 10/1991 | Coleman et al. ...................... 379/93.11 |
| 5,059,141 | 10/1991 | Scott . |
| 5,062,133 | 10/1991 | Melrose ............................... 379/93.11 |
| 5,119,412 | 6/1992 | Attallah . |
| 5,249,218 | 9/1993 | Sainton . |
| 5,361,296 | 11/1994 | Reyes et al. . |
| 5,367,563 | 11/1994 | Sainton . |
| 5,440,619 | 8/1995 | Cann ................................... 379/100.16 |
| 5,499,287 | 3/1996 | Campbell et al. ................... 379/93.11 |

*Primary Examiner*—Wing F. Chan
*Attorney, Agent, or Firm*—Robert E. Bushnell, Esq.

[57] ABSTRACT

A computer system with a mode switching function capable of discriminating a DTMF signal serving as a mode selection signal and supporting a variety of communication services in accordance with the mode selection signal. The computer system includes a main computer unit for executing computer computation function and supporting a variety of communication services such as an automatic answering service, a facsimile communication service, a data communication service, a visual communication service and the like, a modem and an automatic answering unit. The main computer unit has a system bus, a storage device including a memory connected to the system bus for storing service application programs and data, and a central processing unit (CPU) connected to the system bus for executing computer computation function and executing the service application programs capable of supporting the variety of communication services. The modem which is an interface device coupled between the main computer unit and a telephone line for permitting the exchange of digital data with the remote communication terminal, such as a telephone, an automatic answering machine, a facsimile machine, a modem-supported computer, a visual communication machine or the like, over the telephone line by providing an interface function between each terminal and the telephone network.

15 Claims, 5 Drawing Sheets

5,953,397

COMPUTER SYSTEM WITH MODE SWITCHING FUNCTION AND METHOD OF CONTROLLING THE SAME

CLAIM FOR PRIORITY

This application makes reference to, incorporates the same herein, and claims all benefits accruing under 35 U.S.C. §119 from an application for COMPUTER SYSTEM WITH MODE SWITCHING FUNCTION AND METHOD OF CONTROLLING THE SAME earlier filed in the Korean Industrial Property Office on May 10, 1996 and Apr. 10, 1997, and there duly assigned Serial No. 96-15377.

BACKGROUND OF THE INVENTION

1. Technical Field

The present invention relates to a computer system with mode switching functions, and more particularly, relates to a computer system capable of supporting a variety of communication services in response to a mode selection signal over a communication line, and a method of controlling the same.

2. Related Art

Generally, local and remote computers communicate over a telephone line by way of computer modems. Conventional computer terminals can support a variety of communication services, such as data, facsimile, and voice through the modem mounted thereto. Computer modem is an interface device coupled to the computer terminal and a telephone line to permit the exchange of digital data with remote modem-supported computer terminal over the telephone line. Some computer modems as disclosed, for example, in U.S. Pat. No. 5,059,141 for Modem/Telephone Handset Cord Adaptor issued to Scott, U.S. Pat. No. 5,249,218 for Programmable Universal Interface System and U.S. Pat. No. 5,367,563 for Programmable Universal Modem System And Method For Using The Same both issued to Sainton, are selectively operated using communications software to support communication with a variety of different telephone systems.

Computer modem is typically plugged into a telephone jack connected to a telephone line and is positioned inside or adjacent to the computer terminal. To support data transmission to a remote computer terminal, the modem transforms the digital data from the local computer terminal into analog format necessary for telephone line transmission. At the receiving end, a second modem of the remote computer terminal transforms received analog signal into digital data which is provided to its local computer terminal. While the conventional computer modems are configured to communicate in facsimile communication mode, there is no standardized configuration for modems to process in two or more data communication modes including data, facsimile and voice. This is because the modems cannot discriminate a dual tone multi-frequency (DTMF) code signal following a ring signal. As a result, conventional computer systems cannot support a variety of communication services in response to the DTMF code signal serving as a communication mode.

One recent effort to configure computer modems to support a variety of communication services including data, facsimile and voice is disclosed in U.S. Pat. No. 5,361,296 for Modem With Ring Detection/Modem Processing Circuitry issued to Reyes et al. However, the modem processing circuitry of Reyes '296 requires a facsimile/data modem software with data protocol that responds to distinctive ring type associated with a ring signal offered by telephone companies. The modem of Reyes '296 does not discriminate the DTMF signal following the ring signal to support the communication services. While the computer modem of Reyes '296 has its own merits, I have observed that further improvement can still be contemplated.

SUMMARY OF THE INVENTION

Accordingly, it is therefore an object of the present invention to provide a computer system with a mode switching function for supporting a variety of communication services including voice, facsimile, data and visual communications.

It is also an object to provide a computer system with a mode switching function capable of discriminating a DTMF signal serving as a mode selection signal and supporting a variety of communication services in response to the mode selection signal.

These and other objects of the present invention can be achieved by a computer system with a mode switching function which comprises a main computer unit having a system bus, a storage device connected to the system bus for storing a plurality of service application programs and data, and a central processing unit (CPU) connected to he system bus for executing computer computation function and executing the service application programs for supporting a variety of communication services. A modem is connected between the main computer unit and a remote terminal over a communication line for permitting the exchange of digital data therebetween. An automatic answering unit is connected between the main computer unit and the modem to automatically answer with a pre-recorded message through the modem upon receipt of a ring signal The main computer unit is used to discriminate a mode selection signal (e.g., a DTMF tone code signal) following the ring signal to perform any one of the service application programs in accordance with the mode selection signal.

According to another aspect of the present invention, a method of supporting a variety of communication services in a computer system including a main computer unit, a modem connected to a remote communication terminal via a telephone jack, and an automatic answering unit comprising the steps of: determining whether an initializing routine of the automatic answering unit is required in accordance with a key entry from the main computer unit; when the initializing routine of the automatic answering unit is required, performing the initializing routine to record a message in a memory of the automatic answering unit; determining whether a ring signal indicating an incoming call from a remote communication terminal is detected from the modem; when the ring signal is detected from the modem, performing a message answering routine to automatically answer the incoming call with a recorded message requesting selection of service application programs stored in the main computer unit for supporting the communication services; determining whether a mode selection signal subsequent to the ring signal indicating selection from the remote communication terminal is detected from the modem; and discriminating the mode selection signal subsequent to the ring signal to perform one of the service application programs in accordance with the mode selection signal.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
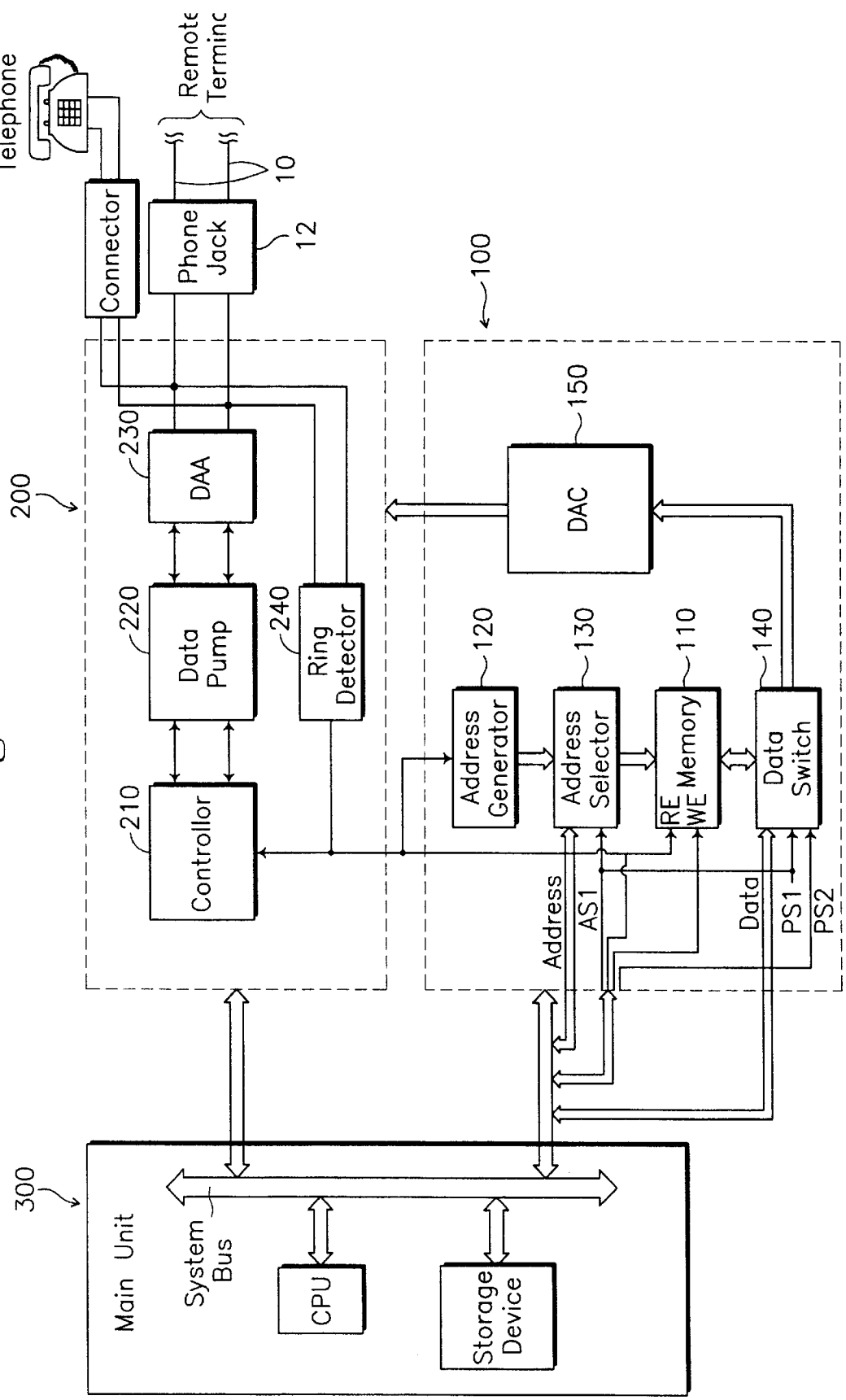
FIG. 1 is a block diagram of a novel computer system with a mode switching function constructed according to the principles of the present invention.

Referring now to the drawings and particularly to FIG. 1, which illustrates a novel computer system constructed according to the principles of the present invention. The computer system includes an automatic answering unit 100, a modem 200 connected to a telephone 16 via a connector 14 and telephone lines 12 to a remote terminal via a telephone jack 12, and a main computer unit 300 for executing computer computation function and supporting a variety of communication services such as an automatic answering service, a facsimile communication service, a data communication service, a visual communication service and the like.

The main computer unit 300 includes a system bus, a storage device 310 containing a memory (not shown) connected to the system bus to store programs and data, and a central processing unit (CPU) 320 connected to the system bus for executing computer computation function and executing a plurality of programs capable of supporting the variety of communication services.

The modem 200 which is an interface device coupled between the main computer unit 300 and a telephone line 10 serving as a communication line. The modem 200 permits the exchange of digital data with remote terminals, such as a telephone, an automatic answering machine, a facsimile machine, a modem-supported computer, a visual communication machine or the like, over the telephone line 10 by providing an interface function between each terminal and the telephone network. The modem 200 is plugged into the telephone jack 12 connected to the telephone lines 10 and is positioned adjacent to the main computer unit 300, as shown in FIG. 1. However, the modem 200 is capable of being installed inside the main computer unit 300. To support transmission of digital data to a remote terminal, the modem 200 transforms the digital data from the main computer unit 300 into analog form necessary for telephone line transmission. At the receiving end, the remote terminal (e.g., a remote modem-supported terminal) transforms received analog signals into digital data which is provided to its data terminal. The automatic answering unit 100 is connected to the main computer unit 300 and the modem 200 for automatically answering a previously stored message in a memory by detecting a ring signal over the telephone line 10.

As shown in FIG. 1, the modem 200 has three major sections, for example, a telephone line interface, a controller 210, and a datapump 220. The telephone line interface connects the telephone line 10 to the modem 200 and optionally to a local communications device such as a telephone or an answering machine. The telephone line interface typically includes a ring detector 240 which sends digital information to the controller 210 and a data access arrangement (DAA) 230 for transmitting analog information between the telephone line 10 and the modem's datapump 220. The controller 210 may also include a data terminal interface which links the modem 200 to the main computer unit 300 and is typically a serial interface for an external device and a parallel interface for the modem 200 that remains inside the main computer unit 300.

The controller 210 executes a program for directing the functions of the modem 200. That is, the controller 210 excesses the program to configure the datapump 220 to exchange the digital data with the remote terminal in accordance with the service application program selected to support a specific communication service including voice, facsimile, data and visual communications. The controller 210 may compress data coming from the data terminal interface before sending the same to the datapump 220 and may decompress data coming from the datapump 220 before sending the same to the data terminal interface. In addition, the controller 210 provides commands to the main computer unit 300 to access to the configurational features of the modem 200. The datapump 220 is typically a single hardware unit configured by the controller 210 to execute different instruction sets for supporting different communication services including voice, facsimile, data and visual communications and processing data therefrom in accordance with a corresponding protocol. The datapump 220 may include separate hardware units each supporting voice, facsimile, data and visual communications respectively.

The datapump 220 may convert digital data from the data terminal interface into analog signals to be sent through the telephone line interface to the telephone line 10, or convert analog signals received from the telephone line 10 via the telephone line interface into digital data to be transmitted through the data terminal interface. The datapump 220 is configured to process data in accordance with selected one of a voice, facsimile, data and visual protocol. It is noted here that while "modem" originates from modulator demodulator, no modulation is required for supporting voice communication. The datapump's facsimile, data, and voice protocols may be set to varying speeds and modes.

The automatic answering unit 100 has five major circuit sections, such as an address generator 120, an address selector 130, a memory 110, a data switch 140 and a DAC (digital-to-analog converter) 150. The address generator 120 has a counter connected to the ring detector 240, and generates an address signal in response to a ring signal from the ring detector 240. The address selector 130 has a multiplexer which receives two address signals, one of which is the address signal from the address generator 120 and the other is an address signal from the main computer unit 300. The address selector 130 selects one of the address signals in response to an address selection signal AS1 from the main computer unit 300.

The memory 110 contained in the automatic answering unit 100 is provided to store data from the main computer unit 300 in accordance with a write enable signal WE and to read the stored data therefrom in accordance with the ring signal serving as a read enable signal RE. The data from the main computer unit 300 are information indicating an automatic answering message. The data switch 140 forms one of first, second and third data transfer paths in response to two path selection signals PS1 and PS2. The first data transfer path is formed between a system bus of the main computer unit 300 and the memory 110 of the automatic answering unit 100, the second data transfer path is formed between the memory 110 and the DAC 150, and the third data transfer path is formed between the system bus of the main computer unit 300 and the DAC 150. If the first data transfer path is formed by the path selection signals PS1 and PS2, an automatic answering message (i.e., digital information) is stored into the memory 110 through the data switch 140. If the second data transfer path is formed, the message stored in the memory 110 is supplied through the data switch 140 to the DAC 150 and converted into an analog signal. This analog signal is then provided to the DAA 230 of the modem 200 and is transferred through the communication line 10 to a remote machine such as a telephone, a remote modem-supported terminal, a data transfer terminal, a visual communication machine or the like. If the third data transfer path is formed, some digital information from the main computer unit 300 are directly provided through the data switch 140 to the DAC 150. The address selection signal AS1 may be used as the path selection signal PS1, and thus the address selector 130 is operated associated with the data switch 140. As described, the DAC 150 is provided to convert a digital signal into an analog signal, and the converted signal is supplied to the DAA 230 of the modem 200.

The method of controlling the computer system with a mode switching function will be described in detail with reference to FIGS. 2 through 5 as follows.

Figure 2:
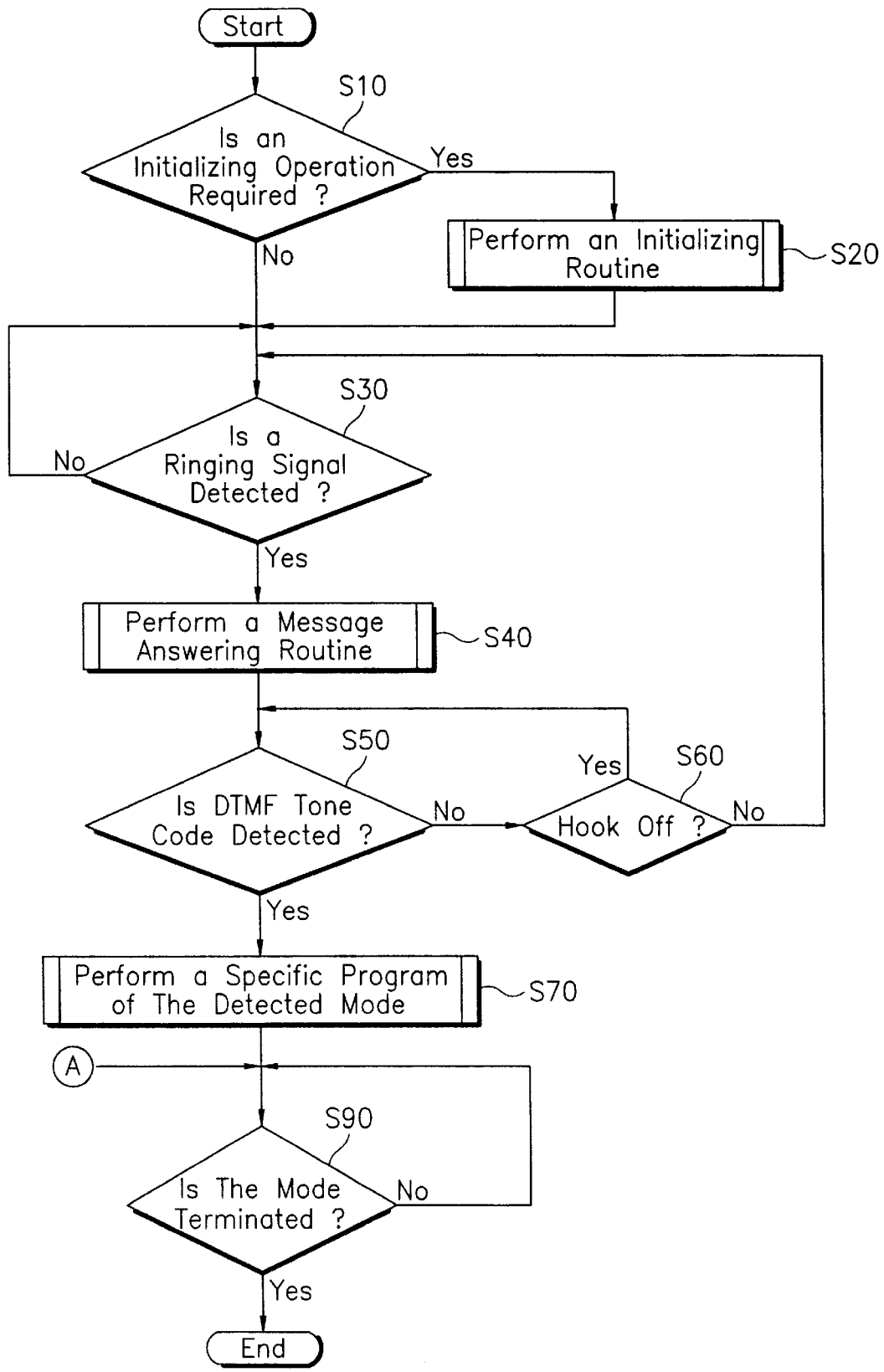
FIG. 2 is a flow chart of the mode switching program executed by the computer system as shown in FIG. 1.

Referring to FIG. 2, when the controlling operation of the computer system is started, the main computer unit 300 determines whether an initializing routine of the automatic answering unit 100 is required in accordance with a key entry from a keyboard at step S10. If the initializing routine of the automatic answering unit 100 is required, the control proceeds to step S20 to perform the initializing routine of the automatic answering unit 100. If the initializing routine of the automatic answering unit 100 is not required, the control proceeds to step S30.

Figure 3:
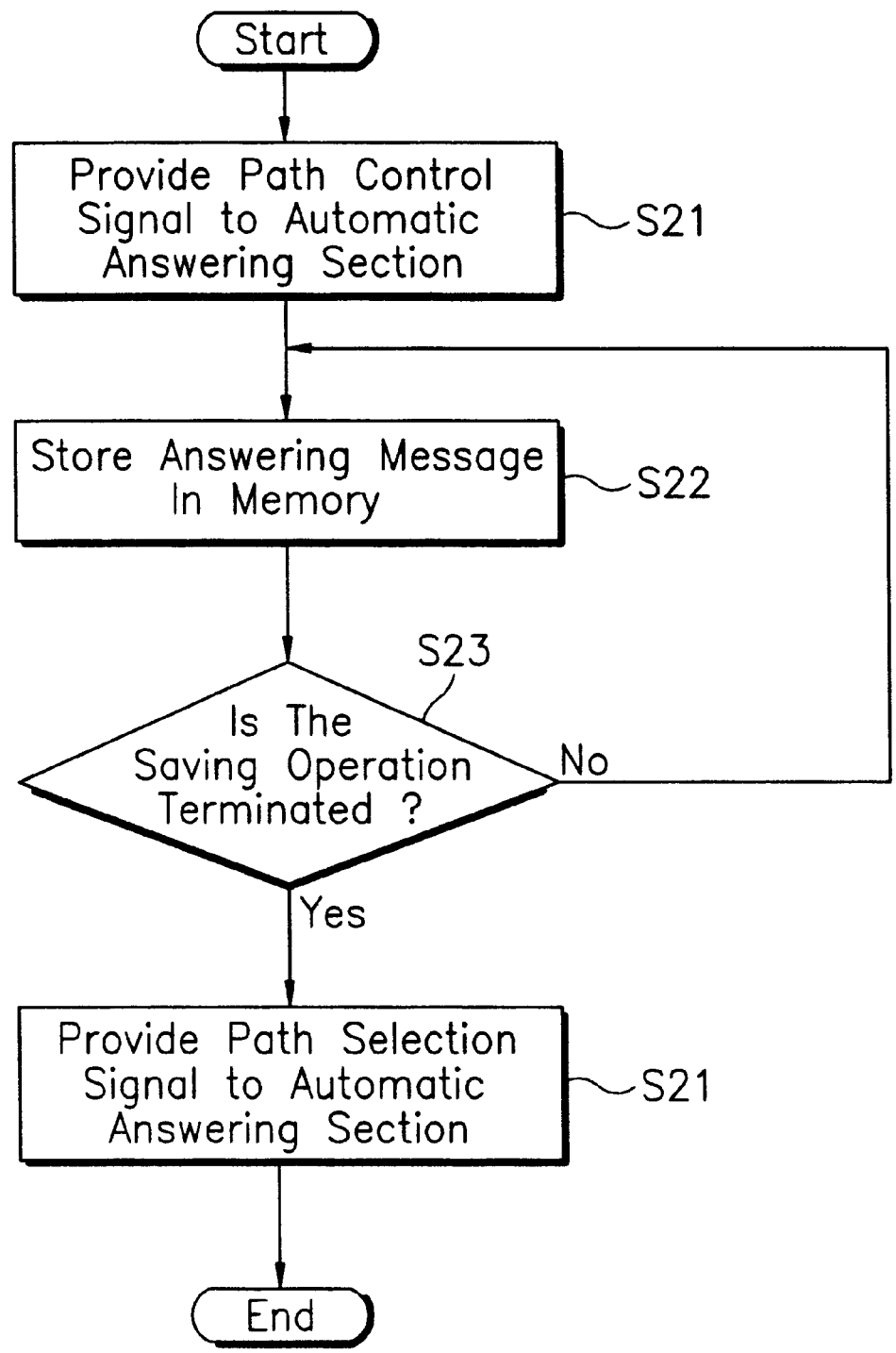
FIG. 3 is a flow chart of the initializing program executed by the computer system as shown in FIG. 1.

FIG. 3 illustrates an operation of the initializing routine of the automatic answering unit 100 at step 20 of FIG. 2. The initializing routine is necessary for the main computer unit 300 to record a message in the memory 110 of the automatic answering unit 100 in order to transmit the pre-recorded message to, for example, a calling telephone, when a ring signal is detected from the modem 200. At step S21, the main computer unit 300 provides an initializing signal through its system bus to the automatic answering unit 100 and the control proceeds to step S22. The initializing signal represents address and control signals from the main computer unit 300 requesting formation of the first data transfer path between the main computer unit 300 and the memory 110 of the automatic answering unit 100 in order to record a digital message in the memory 110 through the data switch 140. This digital message is produced by means of the electrical conversion of a human voice through a microphone (not shown), which is mounted on the main computer unit 300, or may be a digital signal which is previously stored in a memory device (not shown) of the main computer unit. At step S22, when the address signal from the main computer unit 300 is provided through the address selector 130 to the memory 110, the digital message is stored in the memory 110 through the data switch 140 and the control proceeds to step S23.

At step S23, the main computer unit 300 determines whether the recording operation of a digital message in the memory 110 is completed. If the recording operation is not completed, the control jumps again to step S22. If the recording operation is completed, however, the control proceeds to step S24, wherein the path selection signals PS1 and PS2 are supplied to the automatic answering unit 10 to allow the first data transfer path to be intercepted.

The initializing routine is completed after the digital message is recorded in memory 110 of the automatic answering unit 100. The control then proceeds to step S30, wherein a ring signal through the ring detector 240 of the modem 200 is detected by the main computer unit 300. If the ring signal is detected by the ring detector 240 of the modem 200, the control proceeds to step S40, wherein a message answering routine is performed requesting selection of specific service application program for supporting communication services including voice, facsimile, data and visual communications, and thus the second data flowing path is formed.

Figure 4:
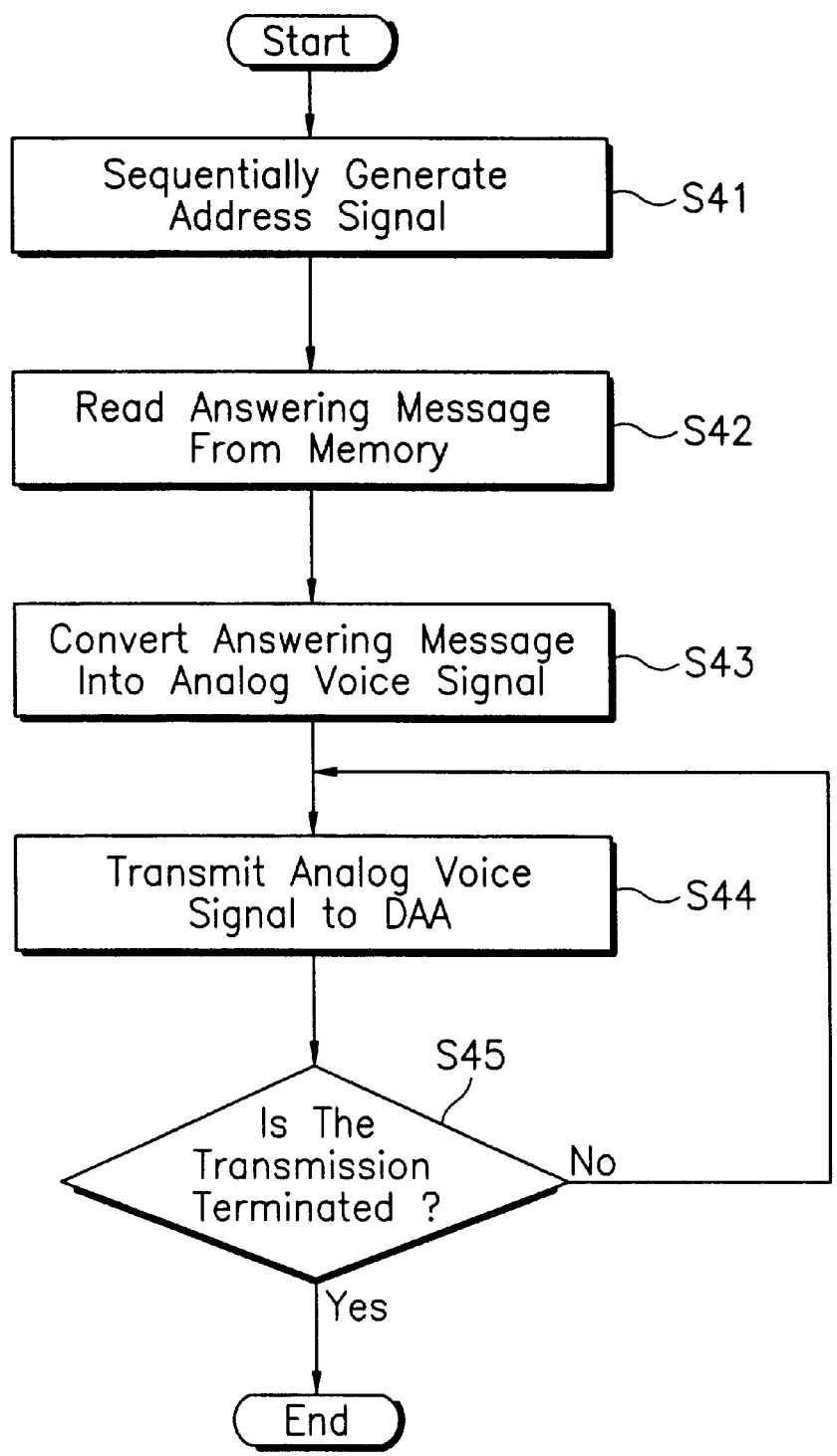
FIG. 4 is a flow chart of the automatic answering program executed by the computer system as shown in FIG. 1.

The message answering routine performed at step S40 will be described with reference to FIG. 4. At step S41, the address generator 120 of the automatic answering unit 100 generates an address signal in response to the ring signal, and the control proceeds to step S42. The address signal is then supplied to the memory 110 via the address selector 130. The supply of the address signal from the address generator 120 to the memory 110 maybe achieved by the address selection signal AS1, which is generated from the main computer unit 300 when the ring signal is detected. At step S42, if the address signal is provided to the memory 110, the recorded message is read out of the memory 110 and is converted into an analog message signal by the DAC 150 via the data switch 140 at step S43. The analog message signal converted by the DAC 150 is then provided via the DAA 230 of the modem 200 to the telephone line 10 at step S44. Accordingly, a human voice as a pre-recorded message is transmitted to a calling telephone over the telephone line 10 . This pre-recorded message may indicate, for example:

"Thank you for your calling, this is Mr. Hong Keel-Dong speaking. Please push a button No. 1 for your voice message, a button No. 2 for facsimile communication, a button No. 3 for data communication, and a button No. 4 for visual communication."

When the pre-recorded message in a form of an analog voice signal is completely transmitted to the DAA 230 of the modem 200 at step S45, the message answering routine is terminated. If not, the control jumps again to step S44.

After the message answering routine requesting selection of specific service application programs for supporting communication services is performed at step S40, the main computer unit 300 determines whether a DTMF tone code is detected from the telephone line 10 in response to a specific button on the calling telephone pressed by a caller at step S50. If the DTMF tone code is detected from the telephone line 10, the control proceeds to step S70, wherein a corresponding service application program for supporting communication service for one of voice, facsimile, data and visual communications is performed. If the DTMF tone code is not detected from the telephone line 10, however, the control proceeds to step S60, where the main computer unit 300 checks whether a hook switch of the calling telephone is at off-hook. Herein, if the hook switch at the calling telephone is not off-hook, the control jumps again to step S30. If the hook switch is off-hook, the control returns to step S50, wherein the main computer unit 300 continues to detect the DTMF tone code from the telephone line 10.

The DTMF tone code detected thus can be recognized as a mode selection signal by means of the datapump 220 and is provided via the controller 210 to the main computer unit 300. After this time, the main computer unit 300 executes a program capable of supporting a communication service corresponding to the DTMF tone code. In order to support a variety of communication services such as, an automatic answering function, a facsimile, data, or visual communication functions, various service programs must be previously installed in the memory of storage device 310 of the main computer unit 300.

Figure 5:
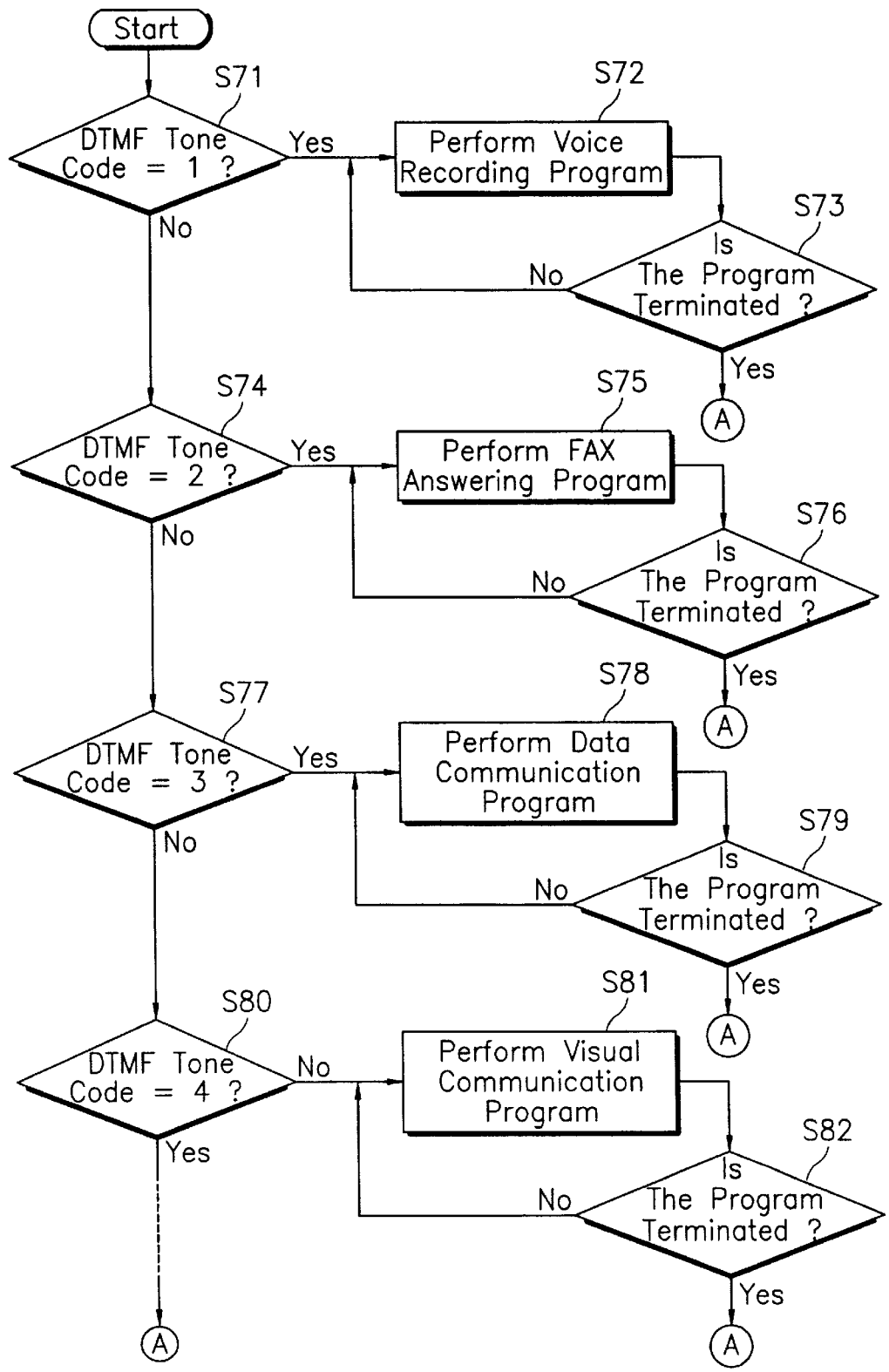
FIG. 5 is a flow chart of the service performing program executed by the computer system as shown in FIG. 1.

The service application program performed at step S70 will be described in detail with reference to FIG. 5. At step S71, the main computer unit 300 determines whether a DTMF tone code over the telephone line 10 is detected as a first mode selection signal corresponding to the button No. 1 pressed by the caller. If the DTMF tone code corresponds to a first mode selection signal, the control proceeds to step S72, wherein a voice recording program is performed in the main computer unit 300. According to the voice recording program, the main computer unit 300 starts to record a calling person' voice at the calling telephone over the telephone line 10 until the voice recording program is terminated at step S73. The calling person' voice is recorded in a storage device 310 via the modem 200.

If a DTMF tone code does not correspond to the first mode selection signal, the control proceeds to step S74, wherein the main computer unit 300 determines whether a DTMF tone-code signal is detected as a second mode selection signal corresponding to the button No. 2. If the DTMF tone code corresponds to a second mode selection signal, the control proceeds to step S75, wherein a facsimile communication program is performed in the main computer unit 300. Accordingly, the main computer unit 300 starts to communicate with a remote system, such as a remote modem-supported terminal, over the telephone line 10 until the facsimile communication program is terminated at step S76. The computer system can then communicate with a remote terminal via the modem 200 in accordance with the facsimile program.

If the DTMF tone code signal does not correspond to the second mode selection signal at step S74, the control proceeds to step S77, wherein the main computer unit 300 determines whether a DTMF tone code is detected as a third mode selection signal corresponding to the button No. 3. If the DTMF tone code corresponds to the third mode selection signal, the control proceeds to step S78, wherein a data communication program is performed in the main computer unit 300. Accordingly, the main computer unit 300 starts to communicate with a remote modem-supported terminal, over the telephone line 10 until the data communication program is terminated at step S79. The main computer unit 300 can then communicate with the remote modem-supported system over the telephone line 10 in accordance with the data communication program.

In addition, if the DTMF tone code does not correspond to the third mode selection signal at step S77, the control proceeds to step S80, wherein the main computer unit 300 determines whether a DTMF tone code is detected as a fourth mode selection signal corresponding to the button No. 4. If the DTMF tone code corresponds to the fourth mode selection signal, the control proceeds to step S81, wherein a visual communication program is performed in the main computer unit 300. Accordingly, the main computer unit 300 starts to communicate with a remote modem-supported terminal having a visual communication function, over the telephone line 10 until the visual communication program is terminated at step S82. The main computer unit 300 can communicate with the remote modem-supported system over the telephone line 10 in accordance with the visual communication program.

After performing the corresponding service application program, the control proceeds to step S90, wherein the main computer unit 300 determines whether the mode switching function is terminated.

As described above, a computer system according to the present invention can effectively and efficiently support a variety of communication services including voice, facsimile, data and visual communications in response to a mode selection signal over a communication line.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A computer system with a mode switching function, comprising:

a main computer unit having a system bus, a storage device connected to said system bus for storing programs and data, and a central processing unit connected to said system bus for executing computer computation function and executing a plurality of service application programs of supporting a variety of communication services;

a modem connected between said main computer unit and a remote communication terminal over a communication line, for permitting the exchange of data there between;

an automatic answering unit connected between said main computer unit and said modem, for providing an automatic answer service with a pre-recorded message through said modem upon receipt of a ring signal through said modem, said pre-recorded message being recorded in said automatic answering unit in accordance with a first address signal from said main computer unit and reproduced therefrom to said remote communication terminal through said modem, said automatic answering unit comprising:

an address generator for generating a second address signal in response to said ring signal;

a data switch for forming first, second and third data paths in response to at least two path selection signals;

an address selector for selecting one of said first and second address signal in accordance with an address selection signal from said main computer unit;

a memory for storing said pre-recorded message from said main computer unit along said first data path in accordance with said first address signal and for enabling reproduction of said pre-recorded message along said second data path in accordance with said second address signal; and a converter for converting said pre-recorded message reproduced from said memory via said second data path and message data directly from said main computer unit via said third data path into an analog message signal through said modem; and said main computer unit for discriminating a dual tone modulated frequency (DTMF) mode selection signal, received from said remote communication terminal according to an instruction in said pre-recorded message, to perform any one of said service application programs for supporting corresponding communication services in accordance with said DTMF mode selection signal.

2. The computer system of claim 1, further comprised of said communication services including voice, facsimile, data and visual communications with said remote communication terminal.

3. The computer system of claim 1, further comprised of said address generator comprising a counter operated in synchronization with said ring signal.

4. The computer system of claim 3, further comprised of said address selector comprising a multiplexer for receiving said first and second address signals and selecting one of said first and second address signals in response to said address selection signal.

5. The computer system of claim 1, further comprised of said address selector comprising a multiplexer for receiving said first and second address signals and selecting one of said first and second address signals in response to said address selection signal.

6. A computer system, comprising:
   a main computer unit having a system bus, a storage device connected to said system bus for storing service application programs to support a variety of communication services with a remote communication terminal over a communication line, and a central processing unit for executing selected one of said service application programs in accordance with a dual tone multi-frequency (DTMF) mode selection signal;
   a modem connected between said main computer unit and said remote communication terminal over said communication line, for receiving a ring signal and said DTMF mode selection signal followed by said ring signal and for permitting the exchange of data therebetween;
   an automatic answering unit connected between said main computer unit and said modem, for providing an automatic answer service to said remote communication terminal with a pre-recorded message through said modem upon receipt of said ring signal from said remote communication terminal through said modem, said automatic answering unit comprising:
      an address generator for generating a second address signal in response to said ring signal;
      a data switch for forming first, second and third data paths in response to at least two path selection signals;
      an address selector for selecting one of said first and second address signal in accordance with an address selection signal from said main computer unit;
      a memory for storing said pre-recorded message from said main computer unit along said first data path in accordance with said first address signal and for enabling reproduction of said pre-recorded message along said second data path in accordance with said second address signal; and
      a converter for converting said pre-recorded message reproduced from said memory via said second data path and message data directly from said main computer unit via said third data path into an analog message signal through said modem; and
   said main computer unit discriminating said DTMF mode selection signal followed by said ring signal to perform any one of said service application programs for supporting corresponding communication services in accordance with said DTMF mode selection signal.

7. The computer system of claim 6, further comprised of said communication services including voice, facsimile, data and visual communications with said remote communication terminal.

8. The computer system of claim 6, further comprised of said modem comprising:
   a ring detector for detecting the ring signal from said communication line;
   a datapump unit capable of processing an incoming call from said remote communication terminal of one of said communication services including voice, facsimile, data and visual communications; and
   a controller coupled to said datapump unit and responsive to said ring detector for controlling said datapump unit to process data between said computer system and said remote communication terminal in accordance with selection of service application programs based upon said ring signal and said DTMF mode selection signal followed by said ring signal.

9. The computer system of claim 8, further comprised of said communication services including voice, facsimile, data and visual communications with said remote communication terminal.

10. A method of supporting a variety of communication services in a computer system including a main computer unit, a modem connected to a remote communication terminal via a telephone jack, and an automatic answering unit, said method comprising the steps of:
    determining whether an initializing routine of said automatic answering unit is required in accordance with a key entry from said main computer unit;
    when the initializing routine of said automatic answering unit is required, performing said initializing routine to record a message in a memory of said automatic answering unit;
    determining whether a ring signal indicating an incoming call from a remote communication terminal is detected from said modem;
    when the ring signal is detected from said modem, performing a message answering routine to automatically answer said incoming call with a recorded message requesting selection of service application programs stored in said main computer unit for supporting said communication services;
    determining whether a mode selection signal subsequent to said ring signal indicating selection from said remote communication terminal is detected from said modem; and
    discriminating said mode selection signal subsequent to said ring signal to perform one of said service application programs in accordance with said mode selection signal.

11. The method of claim 10, further comprised of said initializing routine being performed by:
    generating an initializing signal from said main computer unit to said automatic answering unit through a system bus;
    recording said message from said main computer unit on said memory of said automatic answering unit; and
    forming a data flowing path between said memory of said automatic answering unit and said modem for reproduction of said recorded message to said remote communication terminal via said modem, upon receipt of said ring signal.

12. The method of claim 11, further comprised of said message answering routine being performed by:

generating said second address signal from said main computer unit to said automatic answering unit in response to said ring signal;

reproducing said recorded message from said memory of said automatic answering unit in accordance with said second address signal; and converting said recorded message into an analog signal for transmission to said remote communication terminal through said modem.

13. The method of claim 12, further comprised of said main computer unit comprising a storage device for storing said service application programs to support communication services for each of voice, facsimile, data, and visual communications with said remote communication terminal over said communication line, and a central processing unit for executing selected one of said service application programs in accordance with said mode selection signal.

14. The method of claim 13, further comprised of said modem comprising:

a ring detector for detecting the ring signal from said communication line;

a datapump unit capable of processing said incoming call of one of said communication services including voice, facsimile, data and visual communications; and a controller coupled to said datapump unit and responsive to said ring detector for controlling said datapump unit to process data between said computer system and said remote communication terminal in accordance with selection of service application programs based upon said ring signal and said mode selection signal followed by said ring signal.

15. The method of claim 13, further comprised of said automatic answering unit comprising:

a memory for storing said message from said main computer unit in accordance with a first address signal generated from said main computer unit, and for enabling reproduction of said recorded message in accordance with a second address signal generated from said modem; and a converter for converting said recorded message reproduced from said memory and message data directly from said main computer unit into an analog message signal through said modem.

* * * * *